Feb. 20, 1940.   O. WELCH   2,190,905
INFLATABLE TIRE
Filed Feb. 10, 1937
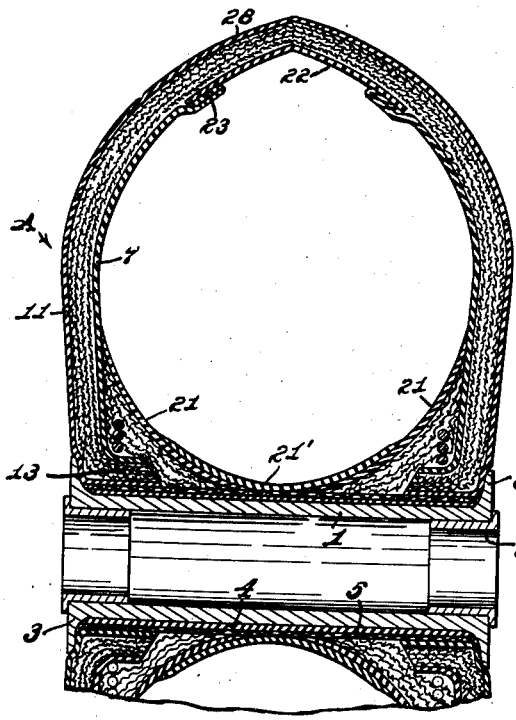
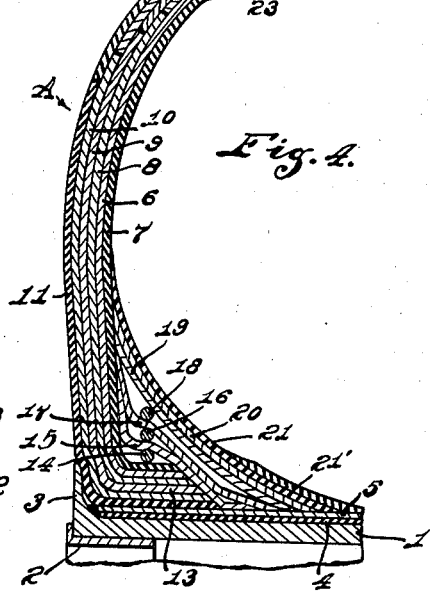
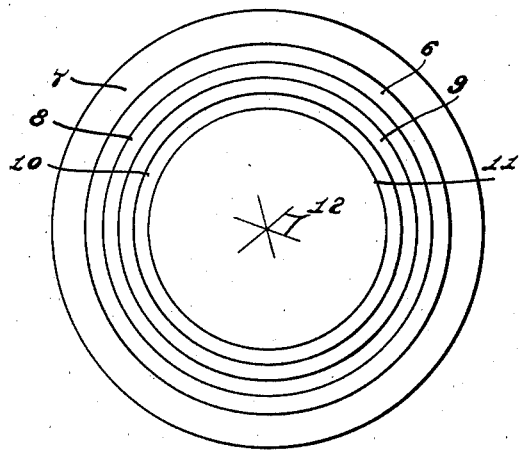
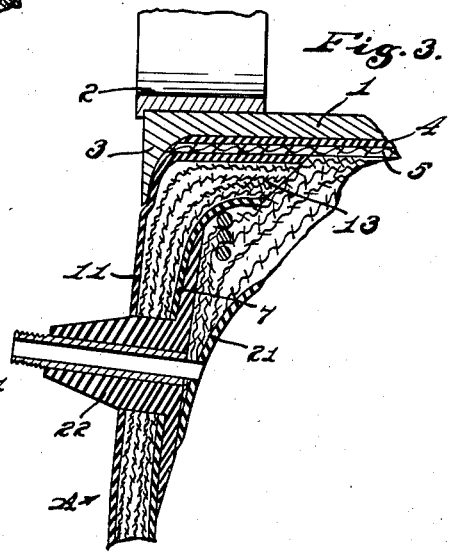
INVENTOR.
Orin Welch,
BY Hood & Hahn.
ATTORNEYS.

Patented Feb. 20, 1940

2,190,905

UNITED STATES PATENT OFFICE 2,190,905

INFLATABLE TIRE

Orin Welch, South Bend, Ind.

Application February 10, 1937, Serial No. 124,951

5 Claims. (Cl. 152—357)

My invention relates to improvements in vehicle wheels and more specifically to an inflatable vehicle wheel adapted primarily for use as landing wheels for airplanes.

It has for one of its objects that of providing a wheel having great shock-absorbing qualities combined with lightness and strength.

Another object of my invention is to obtain an inflatable vehicle wheel having a large cross sectional area as compared with its total diameter to thereby increase its shock-absorbing qualities.

Other objects and advantages of my invention will appear more fully in the appended specification and claims.

For the purpose of disclosing my invention, I have illustrated an embodiment thereof in the accompanying drawing, in which:

Fig. 1 is a partial transverse sectional view of a wheel embodying my invention;

Fig. 2 is a side elevation;

Fig. 3 is an enlarged detail section showing the manner of applying the inflation valve stem; and Fig. 4 is an enlarged diagrammatic section of a portion of my wheel to show more fully the construction thereof.

In constructing my wheel, I provide a hub 1 which may be and preferably is of cast aluminum machined to receive the proper size bushings 2 for the desired axle and machined on the exterior to provide a suitable surface. This hub is provided at its ends with annular flanges 3. In describing the construction of the tire hereinafter and the assembly of the materials on this hub, it will be understood that the material is assembled in its green or uncured state.

The outer surface of the hub 1 is coated with a plurality of coats, preferably two, of rubber cement which is allowed to dry thoroughly. On top of this rubber cement is applied one-sixteenth ply 4 of the uncured hard rubber. A ply of cord fabric 5 is then wrapped around the hub on top of the hard rubber. This cord fabric may be any of the standard cord fabrics now used in the manufacture of commercial automobile tires and is of the cord type impregnated with a suitable rubber compound. The side walls which may be designated as A each comprise a multi-ply disc of material. In the construction of this disc, I provide an inner disc or ply 6 which is the greatest diameter and this inner disc or ply 6 which is of the same cord fabric as the cord fabric 5 has a facing 7 of what is commercially known as tube stock. This is the stock from which the inner tubes of the commercial automobile tires are formed. The upper edge of the tube stock is folded back upon itself, the two layers being cemented together. Additional cord fabric discs 8, 9 and 10, each of a smaller diameter, are assembled on the disc 6. The outer surface is then covered with a layer 11 of rubber of the type known as tread stock. The center of the multi-ply disc above described is cut with a series of radially extending slits 12 to provide an opening to receive the hub 1 and the walls formed by these slits are inturned to form inturned flanges 13 surrounding the hub. The two discs having been assembled on the opposite ends of the hub and on top of the fabric ply 5, each disc is secured on the hub as follows:

One round 14 of preferably 18 gage spring steel or bead wire is secured around the flange 13 having its ends connected in any desired manner as by twisting together or otherwise, so that the wire is drawn tight around the flange and clamps the same on the hub. Over this wire is placed a strip of cord fabric 15, the fabric being cut with the cord running at angle of sixty degrees. This strip is just wide enough to bind the side wall projections and hub together. That is, as indicated at the drawing, it overlaps the inturned ends of the flange 13 sufficiently to come in contact with the fabric 5 and to lay up against the side of the disc. A second binding wire 16 is then laid over the fabric ply 15, then over this is another cord ply 17, the cords being at such an angle to cross the cords of the first strip and running in the opposite direction. This strip, it will be noted, is a little longer than the first strip 15 and extends further up along the side wall and further along the hub. A third binding wire 18 is then applied and a succeeding covering cord strip 19 is applied over the binding wire. This strip, being formed of the same cord fabric as the strips heretofore described, is somewhat longer than the other strips and it will be noted extends further up along the side wall and further toward the center of the hub. After these strips have been laid, an additional strip 20 is laid on to properly cover the binding wires. This last strip 20, of course, is longer than the remaining strips and, as shown, extends further up the side wall of the tire and further towards the center of the hub. In addition to the above-mentioned fabric strips, I wrap or lay in place a pair of strips 21 which are formed of tube material and overlap the fabric strips. Then I wrap a middle strip of tube material around the hub, bridging the strips 21 and forming an air-tight joint. A suitable air valve 22 is also inserted in one of the side walls to permit the inflation of the wheel when completed.

After the two side walls have been assembled on the hub, as above described, I then apply the tread. This tread comprises a series of multi-ply strips connected to the peripheries of the two discs. The innermost peripheral strip 22 is of sufficient width to lap the peripheral edges of the innermost strip 7 and this strip 22, like the ply 7, is formed of tube stock, it being cemented as at 23 to the peripheries of each of the discs. The next strip is of cord stock comprising a ply 24 which is wider than the strip or ply 22 and overlaps the joint of the strip 22 and side-wall disc 7. A third ply strip 25 of cord stock is then built on, its ends overlapping the two side-wall discs 6. A third cord fabric disc 26 is then laid on, its edges overlapping the peripheral edges of the side-wall disc 8. A fourth fabric disc 27 is then laid on this strip, being wider than the next adjacent, and its side edges overlap the peripheral edges of the disc 9. It will be understood, of course, that as each tread strip is laid on the side-wall discs, the overlapping portions are suitably cemented together by rubber cement. Overlying the fabric structure thus built up is then placed a layer 28 of rubber tire stock.

It will be noted that in assembling this structure, after the initial tread strip 22 is applied, an air-tight inner tube structure is provided, which may be filled with air to maintain the formation of the side walls sufficiently stiff to assist in the applying of the additional plies of the tread.

Bearing in mind that all of the above structure as described is assembled with the material in its uncured state, the structure thus assembled is then introduced in a suitable mold, the wheel being inflated with about seventy-five pounds of air pressure. The molds are then placed in a suitable steam kettle under a steam pressure of fifty pounds and kept in the kettle until the stock is completely crude.

While I have described above a method of curing the built up structure, it will be, of course, understood that other methods of curing or vulcanizing the built up structure may be used. There are a number of such accepted methods now commercially used in addition to the one which I have above described.

I have illustrated in the drawing and described in the specification one specific form of hub structure which consists, as illustrated, in a substantially cylindrical tube of relatively small diameter having annular flanges on each side. It will be understood, however, that where I have used the expression "hub" in the claims, the expression contemplates a structure providing a center member adapted to receive the tire structure heretofore described and this center or hub member may be either the specific structure illustrated or a structure wherein the hub member is made larger in diameter such for instance as a center tube having radiating therefrom spokes or like devices with an annular rim-like structure at the outer periphery of the spokes.

It will also be understood that various modifications and changes may be made in the specific structure illustrated and described without departing from the spirit of my invention as set forth in the appended claims.

I claim as my invention:

1. In an inflatable vehicle tire the combination with a hub, of a pair of disc-like side members, each having a plurality of radial slits extending from the center thereof to form inturned flaps embracing said hub, a binding wire embracing said flanges and clamping the same to said hub and a tread member secured to the peripheries of said side members.

2. In an inflatable vehicle tire the combination with a hub, of a pair of disc-like side members, each member having an opening to receive the hub, an annular inturned flange surrounding the walls of said opening and embracing said hub, a plurality of binding wires embracing the flanges of each side member and arranged one on top of the other, a layer of fabric material interposed between the wires and a tread member secured to the peripheries of said side members.

3. In an inflatable tire the combination with a hub surrounded by a layer of hard rubber, of a pair of side members, each comprising a plurality of layers of fabric plies and each having an inner face of tube rubber and an outer face of tread rubber, each of said side members having an opening for receiving the hub and an inturned annular flange surrounding said opening and embracing said hub, means embracing each of said flanges and said hub for clamping the flanges to the hub, an inner flange portion formed with tube rubber extending between the side walls of each of the side members and a multi-ply tread member having an inner wall of tube rubber and an outer wall of tread rubber secured at its edges to the peripheries of said side members.

4. In an inflatable vehicle tire the combination with a hub, of a pair of side members, each comprising a plurality of disc-like layers, the discs decreasing in diameter from the inner to the outer side of the side members, each of said discs having an opening therein to receive the hub member and annular flanges surrounding said opening and embracing the hub, clamping means embracing said annular flanges and the hub for clamping the flanges to the hub and a tread member comprising a plurality of layers, the layers increasing in width, outwardly, and each layer of the tread member overlapping and being secured to the peripheral side wall of each of a corresponding disc of each side member.

5. In an inflatable vehicle tire the combination with a hub, of an inflatable tire structure mounted on said hub having an opening in the two side walls thereof for the reception of said hub and annular flanges surrounding the walls of said opening and extending substantially parallel with said hub, and binding clamps surrounding said flanges and hub and clamping said flanges to said hub.

ORIN WELCH.